(12) United States Patent
Kaiser et al.

(10) Patent No.: US 8,250,768 B2
(45) Date of Patent: Aug. 28, 2012

(54) HANDHELD POWER TOOL

(75) Inventors: Hans Kaiser, Leuzigen (CH); Stefano Delfini, Bettlach (CH); Thilo Koeder, Gerlingen (DE); Martin Affolter, Arch (CH); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 728 days.

(21) Appl. No.: 12/444,189

(22) PCT Filed: Apr. 29, 2008

(86) PCT No.: PCT/EP2008/055202
§ 371 (c)(1),
(2), (4) Date: Apr. 3, 2009

(87) PCT Pub. No.: WO2009/003738
PCT Pub. Date: Jan. 8, 2009

(65) Prior Publication Data
US 2010/0024226 A1 Feb. 4, 2010

(30) Foreign Application Priority Data
Jun. 29, 2007 (DE) .......................... 10 2007 030 246

(51) Int. Cl.
*B23D 49/10* (2006.01)
(52) U.S. Cl. .......................................... 30/392; 30/393

(58) Field of Classification Search ............ 30/392–394; 83/613, 615, 640, 644
See application file for complete search history.

(56) References Cited

U.S. PATENT DOCUMENTS

| | | | | |
|---|---|---|---|---|
| 4,331,051 A | * | 5/1982 | Gerber et al. | 83/74 |
| 4,653,361 A | * | 3/1987 | Zobeli | 82/48 |
| 6,158,126 A | * | 12/2000 | Rose et al. | 30/43.92 |
| 2002/0069736 A1 | * | 6/2002 | Yasoda et al. | 83/62.1 |
| 2002/0178591 A1 | * | 12/2002 | Hecht et al. | 30/392 |

FOREIGN PATENT DOCUMENTS

| | | | |
|---|---|---|---|
| DE | 196 53 242 | | 6/1998 |
| DE | 101 19 561 | | 10/2002 |
| DE | 202004005478 | * | 8/2004 |
| EP | 0153895 | * | 9/1985 |
| JP | 02184401 | * | 7/1990 |
| RU | 2 038 954 | | 7/1995 |

* cited by examiner

*Primary Examiner* — Stephen Choi
(74) *Attorney, Agent, or Firm* — Michael J. Striker

(57) ABSTRACT

A handheld power tool having a power tool that executes a reciprocating motion, in particular a reciprocating power saw with a reciprocating sawblade (14), is disclosed. To prevent the power tool from sawing untrue during the cutting operation, in particular between the upper and lower cutting edges, the power tool is assigned at least one force transducer (19), which measures the magnitude of a transverse force, oriented transversely to the direction of motion, that occurs at the power tool, and at least one actuator (21), which acts on the power tool as a function of the measured magnitude of the transverse force, is provided for transverse force compensation (FIG. 2).

9 Claims, 3 Drawing Sheets

HANDHELD POWER TOOL

CROSS-REFERENCE

The invention described and claimed hereinbelow is also described in PCT/EP2008/055202, filed on Apr. 29, 2008 and DE 10 2007 030 246.2, filed on Jun. 29, 2007. This German Patent Application, whose subject matter is incorporated here by reference, provides the basis for a claim of priority of invention under 35 U.S.C. 119(a)-(d).

BACKGROUND OF THE INVENTION

The invention is based on a handheld power tool having a power tool executing a reciprocating motion, in particular a reciprocating power saw with a reciprocating sawblade.

In a handheld power tool embodied for instance as a reciprocating power saw, having a reciprocating sawblade fastened at one end (German Patent Disclosure DE 101 19 561 A1), exact sawing along a contour predrawn on the workpiece requires a high degree of practice. Nevertheless, there is the risk of erroneous saw cutting, since the sawblade has a tendency to saw untrue because of transverse forces that occur at the sawblade during sawing. In the process, the sawblade always runs first along the lower edge of the workpiece, or in other words the lower cutting edge, so that whenever the user notices that sawing untrue is occurring at the upper edge of the workpiece, a relatively major deviation from the desired contour has already occurred at the lower edge of the workpiece. If, on noticing the deviation from the path at the surface of the workpiece, the user now intervenes to correct this, a considerable error that can no longer be compensated for has already occurred at the lower cutting edge. Even if the line is traced exactly on the surface of the workpiece, untrue sawing by the sawblade at the lower edge of the workpiece cannot be reliably precluded.

SUMMARY OF THE INVENTION

The handheld power tool of the invention has the advantage that by means of the measurement of the transverse forces above and close to the upper cutting edge and by the action of the actuator that compensates for the transverse forces, which engenders minimal compensatory motions at the power tool, the transverse forces are already counteracted when they first occur at the sawblade, so that untrue sawing by the power tool, especially of the sawblade, in straight cuts or cuts with constant radii is avoided.

BRIEF DESCRIPTION OF THE DRAWINGS

The invention is described in further detail in the ensuing description, in terms of an exemplary embodiment shown in the drawings. The drawings respectively show the following, schematically.

DETAILED DESCRIPTION OF THE PREFERRED EMBODIMENTS

Figure 1:
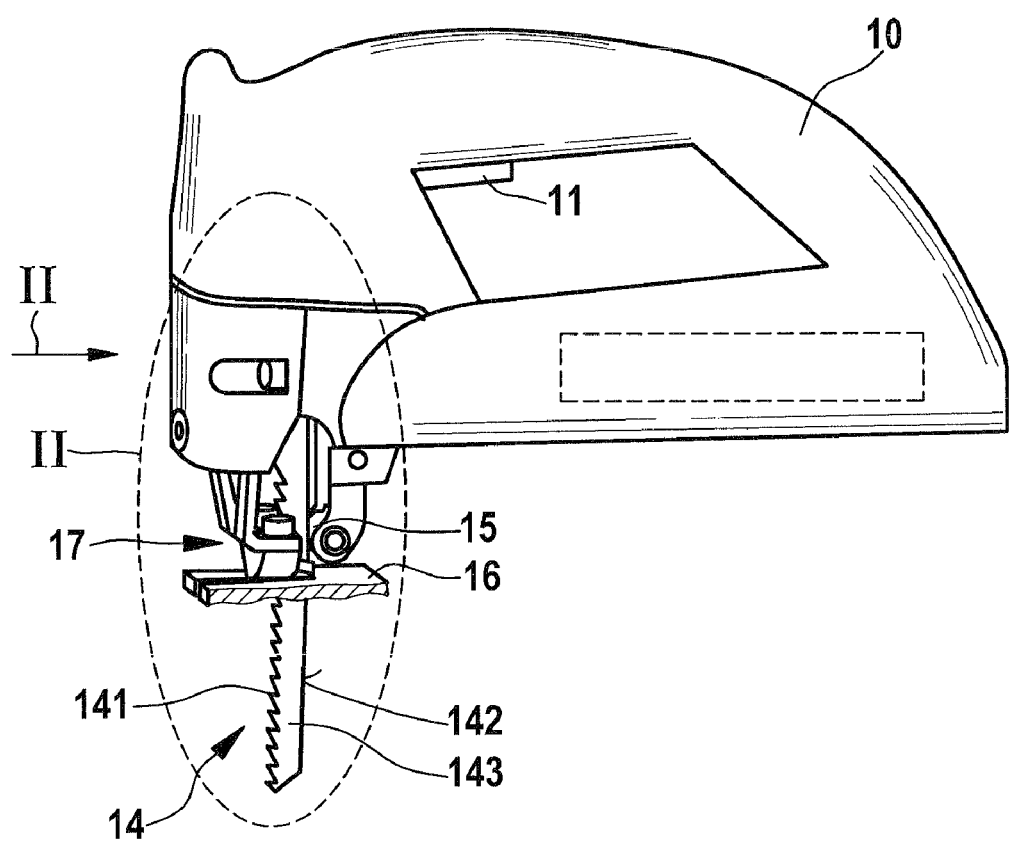
FIG. 1, a side view of a reciprocating power compass saw.
Figure 2:
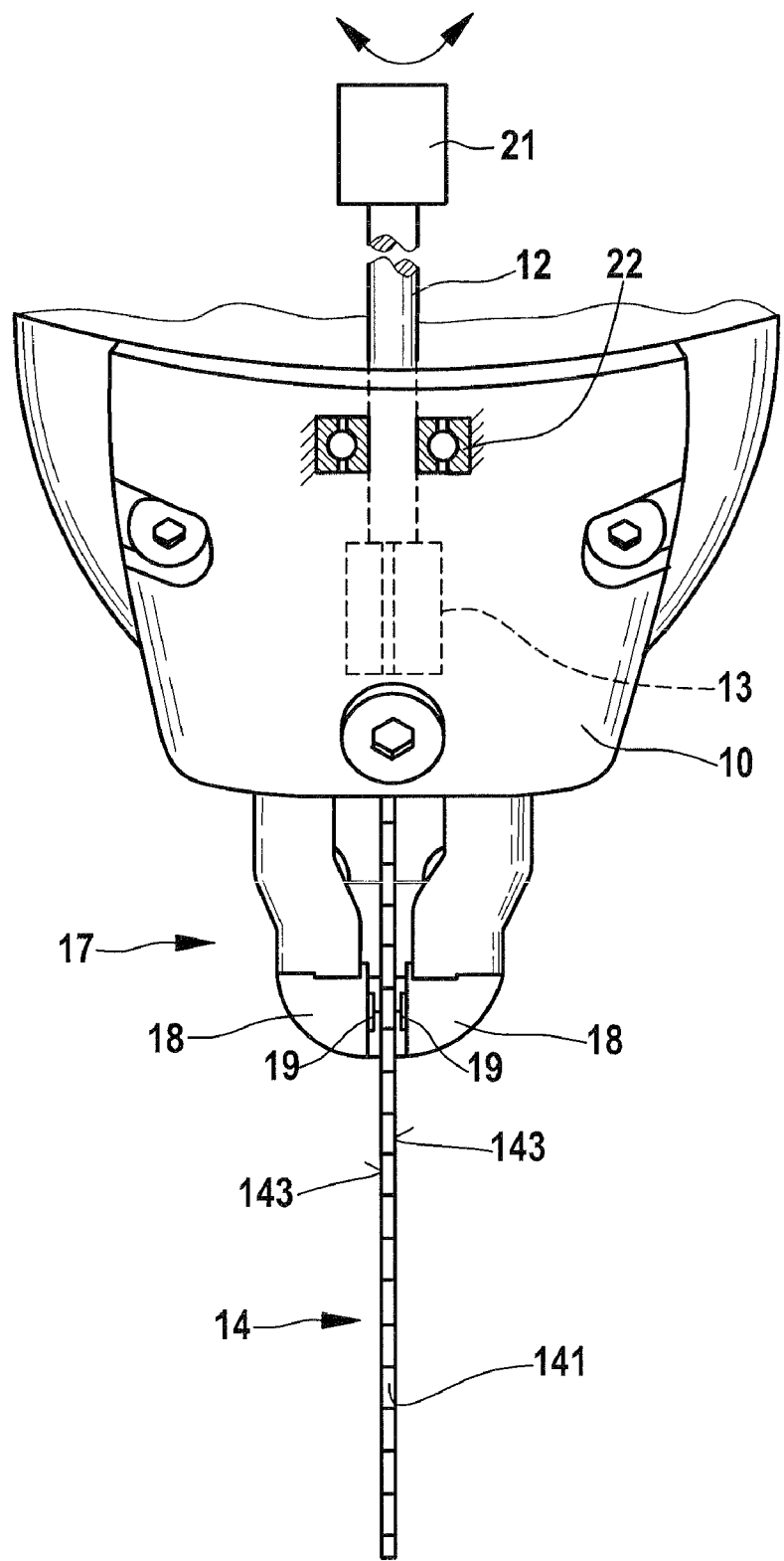
FIG. 2, an enlarged view of the detail marked II in the direction of the arrow II in FIG. 1.

The reciprocating power compass saw shown schematically in a side view in FIG. 1 as an exemplary embodiment for a handheld power tool having a power tool that executes a reciprocating motion has a tool housing 10, in which an electric motor is received, which can be switched on and off by means of an on/off switch 11 and which via a gear drives a lifting rod 12 in an upward and downward reciprocating motion. The lifting rod 12 is guided vertically in a bearing 22 indicated schematically in FIG. 2. A tool holder 13 is located on the lower end of the lifting rod 12, and in it a compass sawblade or a reciprocating sawblade is fastened on one end. The reciprocating sawblade 14, on short sides facing away from one another, has a sawtooth strip 141 on the one hand and a sawblade back 142 on the other. During the stroke of the reciprocating sawblade 14, the sawblade back 142 is braced against a support roller 15 that is retained on the tool housing 10. A foot plate 16 located below the tool housing 10 is also secured to the tool housing 10 and serves to place the reciprocating power compass saw on the workpiece and to guide it. The reciprocating sawblade 14 moving perpendicular to the foot plate 16 is guided through a recess 161 in the foot plate 16. The foot plate 16 is shown in only fragmentary fashion in FIG. 1.

On the reciprocating power compass saw, a guide mechanism 17 is provided, with which the reciprocating sawblade 14 is guided laterally close to the foot plate 16. The guide mechanism 17 comprises two guide jaws 18, of which one guide jaw 18 each is oriented toward one of the two large faces 143, facing away from one another, of the reciprocating sawblade 14.

Figure 3:
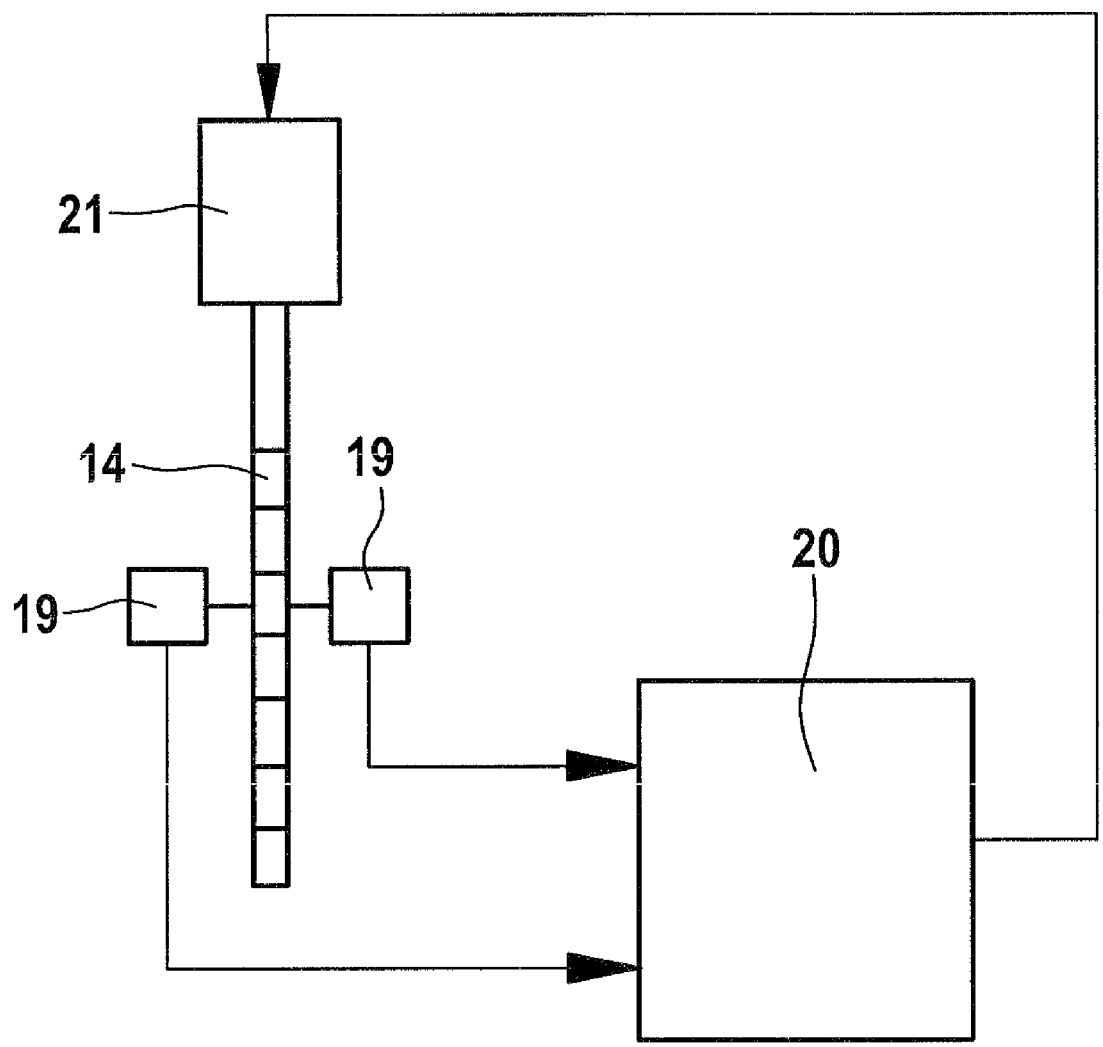
FIG. 3, a regulating circuit in the handheld power tool of FIGS. 1 and 2.

The reciprocating power saw furthermore has a device for transverse force compensation, which in straight cuts or cuts with constant radii prevents the reciprocating sawblade 14 from sawing untrue. The device for transverse force compensation includes two force transducers 19, a regulator 20, and an actuator 21. The force transducers 19, regulator 20 and actuator 21 are combined to make a closed regulating circuit, as is shown in FIG. 3. The force transducers 19, embodied for instance as piezoelectric elements, are integrated each with one of the guide jaws 18 of the guide mechanism 17 and measure the transverse forces that occur at the reciprocating sawblade 14 and that act on the sawblade 14 transversely to the reciprocation direction. The output signals of the two force transducers are delivered to the regulator 20, which applies a correcting variable to the actuator 21, which variable is dependent on the magnitude of the force transducer signals, and the regulator in turn performs such a minimal rotation of the reciprocating sawblade 14 that compensation is brought about for the transverse force acting on the reciprocating sawblade 14 at that moment. The actuator 21 is for instance a piezoelectric control element, which in the exemplary embodiment shown here engages the tool receptacle or the lifting rod 12 and effects a minimal rotation of the tool receptacle or of the lifting rod 12. To that end, the lifting rod 12 can be embodied rotatably within limits, or only an existing rotary play of the lifting rod 12 may be exploited. The actuator forces in the case of a rigid lifting rod 12 can also be introduced directly at the reciprocating sawblade 14, for instance via the guide jaws 18 or other lateral guide rollers that can be displaced linearly or rotated. Alternatively, the transverse forces can also be measured at the lifting rod 12, or its lower bearing 22, by means of force transducers or by way of defined bearing deformations.

The invention claimed is:

1. A handheld power tool, in the form of a reciprocating power saw with a reciprocating sawblade (14), comprising:

at least one force transducer (19) assigned to the reciprocating power tool, wherein said at least one force transducer measures a magnitude of a transverse force occurring at the power saw tool and oriented transversely to the direction of motion; and at least one actuator (21), acting on the power tool as a function of the measured magnitude of the transverse force, for transverse force compensation.

2. The handheld power tool as defined by claim 1, wherein the power tool is fastened in a drivable tool holder (13); and that the at least one force transducer (19) is located, spaced apart from the tool holder (13), in fixed fashion relative to the power tool.

3. The handheld power tool as defined by claim 1, wherein one force transducer (19) is located on each of the sides, facing away from one another, of the power tool; and that the two force transducers (19) are directly diametrically opposite one another on the power tool.

4. The handheld power tool as defined by claim 3, wherein the power tool is guided laterally between guide jaws (18) that are fixed relative to the power tool and are diametrically opposite one another on the power tool; and that one force transducer (19) is integrated with each guide jaw (18).

5. The handheld power tool as defined by claim 1, wherein the at least one actuator (21) is embodied for tripping an at least minimal rotation of the power tool about its longitudinal axis.

6. The handheld power tool as defined by claim 2, wherein the actuator (21) engages the tool holder (13) or a lifting rod (12) that has the tool holder (13) on one end.

7. The handheld power tool as defined by claim 1, wherein the force transducers (19) and the actuator (21) are located in a regulating circuit.

8. The handheld power tool as defined by claim 1, wherein the force transducer (19) has a piezoelectric element.

9. The handheld power tool as defined by claim 1, wherein the actuator (21) is a piezoelectric control element.

* * * * *